United States Patent [19]

Moelants et al.

[11] 4,042,397
[45] Aug. 16, 1977

[54] LIGHT-ABSORBING DYE FOR USE IN PHOTOGRAPHY

[75] Inventors: Felix Jan Moelants, Wilrijk; Jozef Aimé Dierckx, Hove; Henri Depoorter, Mortsel, all of Belgium

[73] Assignee: AGFA-GEVAERT N.V., Mortsel, Belgium

[21] Appl. No.: 676,007

[22] Filed: Apr. 12, 1976

[30] Foreign Application Priority Data

Apr. 30, 1975 United Kingdom ............... 18068/75

[51] Int. Cl.$^2$ .............................................. G03C 1/84
[52] U.S. Cl. ..................................... 96/84 R; 96/87 R
[58] Field of Search ................................. 96/84, 87 R; 260/256.5 R, 240 R

[56] References Cited

U.S. PATENT DOCUMENTS 3,853,563  12/1974  Depooter et al. .................. 96/84 R

*Primary Examiner*—John D. Welsh
*Attorney, Agent, or Firm*—A. W. Breiner

[57] ABSTRACT

Dyes are described corresponding to the following formula for use as light-absorbing dyes in silver halide photographic material:

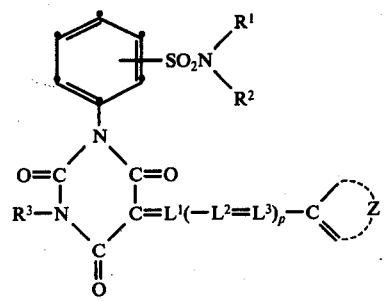

wherein:
Z represents the atoms necessary to form a barbituric acid nucleus ($p=1$ or 2), a phenyl group ($p=0$ or 1) or a pyrrole ring ($p=0$)
each of $L^1$, $L^2$ and $L^3$ represents a methine group,
$R^3$ represents an aliphatic or aromatic hydrocarbon group,
$R^1$ represents hydrogen, alkyl, acyl or amino and
$R^2$ represents hydrogen, alkyl or aryl, or $R^1$ together with $R^2$ represents the atoms necessary to complete a heterocycle.

13 Claims, No Drawings

LIGHT-ABSORBING DYE FOR USE IN PHOTOGRAPHY

The present invention relates to new dyes, to their preparation, to their use in photographic elements as light absorbing dyes and to elements containing said dyes.

It is known, for many purposes, to incorporate light absorbing dyes into photographic elements. Such a light absorbing dye may be used as filter dye in a layer coated over one or more light-sensitive emulsion layers or between two emulsion layers, e.g. differently colour-sensitized emulsion layers, to protect the underlying light-sensitive emulsion layer(s) from the action of light of wavelength absorbed by such light absorbing dye or it may be used as screening dye in a light-sensitive emulsion layer for the purpose of modifying a light record in such emulsion layer or it may be used as antihalation dye in a layer not containing a light-sensitive substance known as antihalation layer situated on either side of the support carrying the light-sensitive emulsion layer(s).

Light absorbing dyes should meet severe demands in order to be useful in photographic elements. They should not affect the inherent sensitivity or spectral sensitivity of light-sensitive emulsions with which they may come into contact. They should have good absorption characteristics and should not give rise to fogging. Further they should be readily bleached i.e. decolourized or destroyed and removed, in at least one of the photographic processing liquids. It is also desirable that they are sufficiently non-wandering i.e. that they do not substantially diffuse from the layers or coatings in which they are incorporated to other layers or coatings e.g. from a filter or antihalation layer to a silver halide emulsion layer, either during manufacture of the photographic material or on storing it or in photographically processing it.

In U.S. Pat. Nos. 3,440,051, 3,653,905, 3,687,670 and 3,853,563 light-absorbing dyes comprising at least one N,N-disubstituted barbituric acid nucleus have been described for use in photographic silver halide elements. Some of the dyes described in these U.S. Patents are sufficiently non-wandering for use in layers in contact with emulsion layers, but are bleached only with difficulty during normal processing. Others are bleached more easily but are not sufficiently non-wandering so that the dye can migrate to emulsion layers and affect the sensitometric properties thereof. Still others affect the general sensitivity or the colour sensitivity of light-sensitive emulsions.

According to the present invention a new class of light-absorbing dyes containing at least one N,N-disubstituted barbituric acid nucleus is provided for use in light-sensitive silver halide elements. These new dyes are non-wandering from filter layers or antihalation layers, are readily bleached by conventional processing solutions and do not affect to a noteworthy extent the sensitivity of light-sensitive emulsions with which they come into contact.

The new dyes of the present invention correspond to the following general formula I.

I.

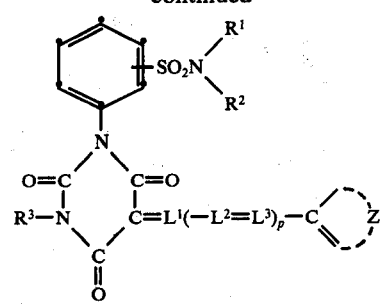

wherein
Z represents
1. the atoms necessary to form a barbituric acid nucleus so that a symmetrical oxonol dye is formed,
2. the atoms necessary to form a phenyl group including a substituted phenyl group so that a benzylidene or cinnamylidene dye is formed, or
3. the atoms necessary to form a pyrrole ring including a substituted pyrrole ring, each of $L^1$, $L^2$ and $L^3$ represents methine including substituted methine e.g. methine substituted by alkyl, aralkyl, aryl or carboxyl, p represents
0 for Z having significance (3),
0 or 1 for Z having significance (2), or
1 or 2 for Z having significance (1)

$R^3$ represents an aliphatic or aromatic hydrocarbon group which may carry substituents e.g. carboxy and sulphamoyl, more particularly a straight-chain or branched-chain alkyl group, e.g. methyl, ethyl, propyl, isopropyl, butyl, t.butyl, hexyl, octyl, etc., cycloalkyl group e.g. cyclohexyl, allyl group, aralkyl group e.g. benzyl, or aryl group e.g. phenyl, carboxy phenyl, sulphamoylphenyl, tolyl, the hydrocarbon group preferably comprising from 4 to 10 carbon atoms, $R^1$ represents hydrogen, an alkyl group including substituted alkyl group e.g. methyl, ethyl, hydroxyethyl and propyl, an acyl group, e.g. acetyl, methylsulphonyl, an amino or substituted amino group, e.g. methyl amino, phenylamino, acetylamino, $R^2$ represents hydrogen, an alkyl group including substituted alkyl group e.g. methyl, ethyl, hydroxyethyl and propyl or an aryl group e.g. phenyl, or $R^1$ together with $R^2$ represent the non-metallic atoms necessary to complete with the nitrogen atom to which they are attached a heterocyclic nucleus e.g. piperidine nucleus, morpholine nucleus or pyrrolidine nucleus.

Preferred dyes according to the present invention are the symmetrical oxonol dyes of the following general formula II, the benzylidene and cinnamilidine dyes of the following general formula III and the pyrrolomonomethine dyes of the following general formula IV.

II.

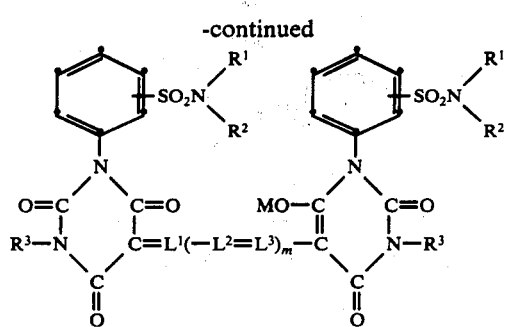

wherein
 m represents 1 or 2, and
 $R^1$, $R^2$, $R^3$, $L^1$, $L^2$ and $L^3$ have one of the significances given hereinbefore,
 M stands for cation, e.g. a hydrogen cation, a metal cation, or an onium cation of organic or inorganic nature such as ammonium and pyridinium.

III.

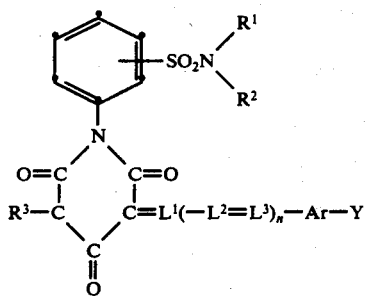

wherein
 n represents 0 or 1,
 $R^1$, $R^2$, $R^3$, $L^1$, $L^2$ and $L^3$ are defined as above,
 Ar represents phenylene or naphtylene, including substituted phenylene or naphtylene, and
 Y represents hydroxyl, alkoxy, alkylthio, or amino including substituted amino e.g.

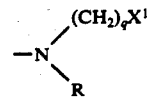

wherein
 q represents 1, 2 or 3,
 $X^1$ represents hydrogen, cyano, carboxyl, alkoxycarbonyl e.g. ethoxycarbonyl, aroxycarbonyl e.g. phenoxycarbonyl, amino, substituted amino, alkylsulphonyl or arylsulphonyl, and
 R represents cycloalkyl e.g. cyclohexyl or $(CH_2)_rX^2$ wherein r and $X^2$ have one of the significances given for q and $X^1$,
 Y preferably represents a N,N-di(carboxy alkyl)amino group e.g. the group

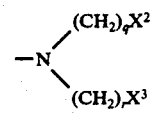

wherein q and r are integers from 1 to 3 and $X^2$ and $X^3$ are carboxyl.

IV.

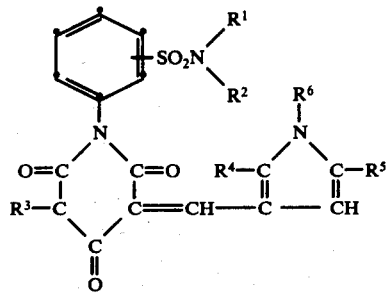

wherein
 $R^1$, $R^2$ and $R^3$ are as defined hereinbefore, each of $R^4$ and $R^5$ are hydrogen, or alkyl, and $R^6$ represents alkyl or aryl which may carry substituents, preferably carboxyl.

Representative examples of dyes according to the present invention are the following.

1.

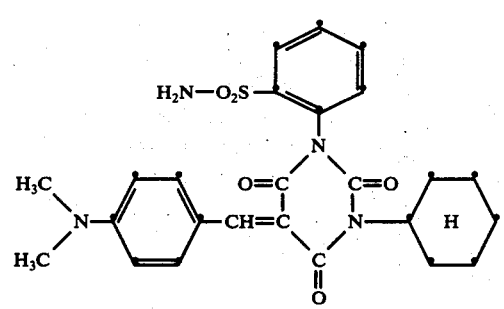

2.

-continued
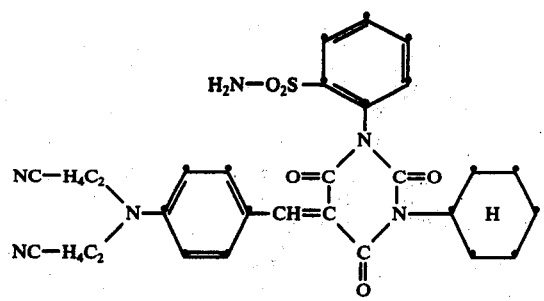
3.
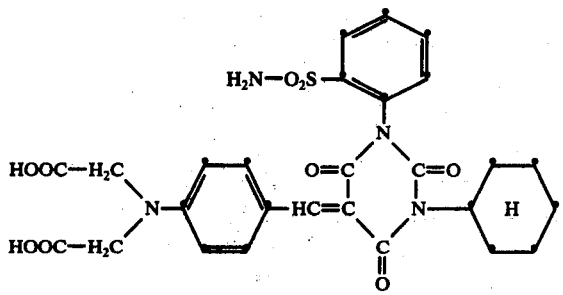
4.
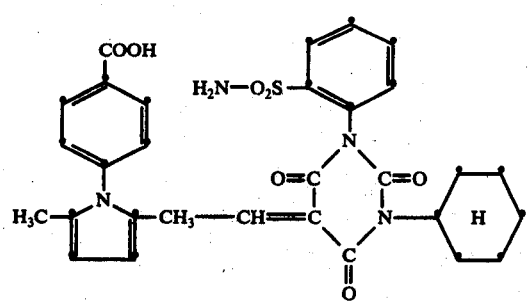
5.
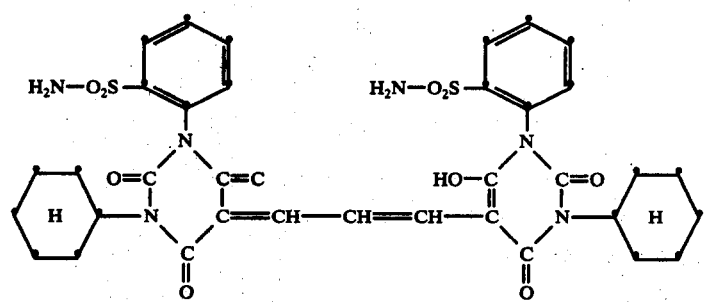
6.
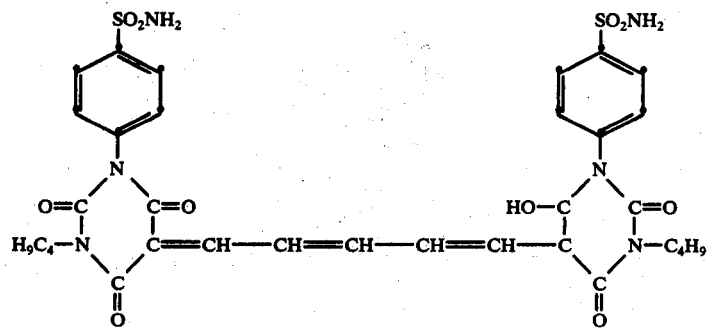
7.

-continued
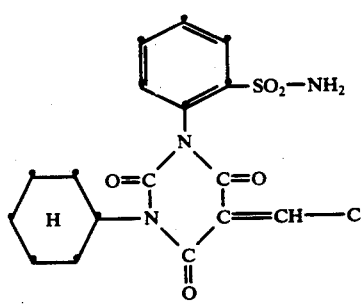 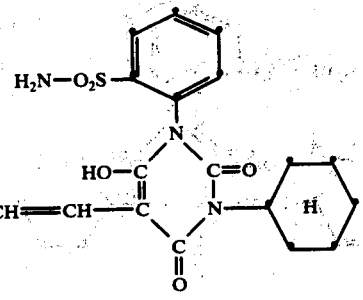
8.
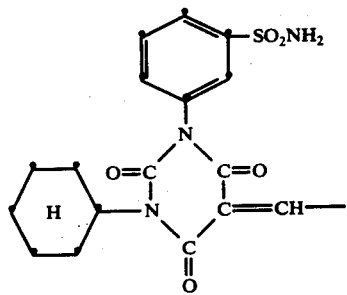 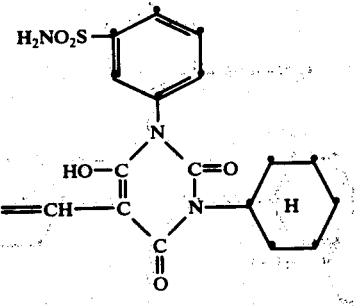
9.
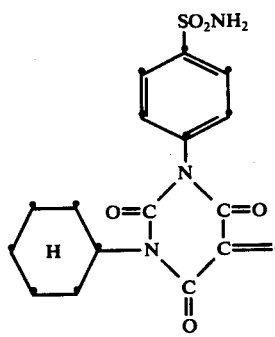 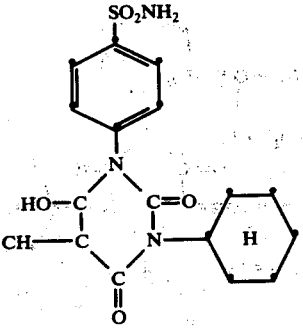
10.
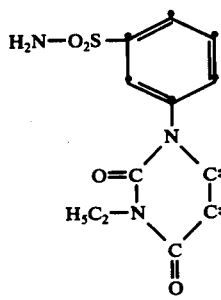 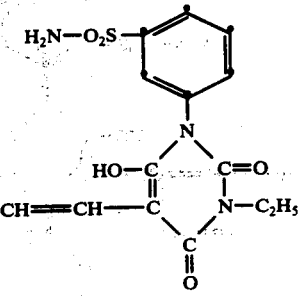
11.
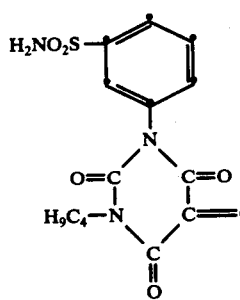 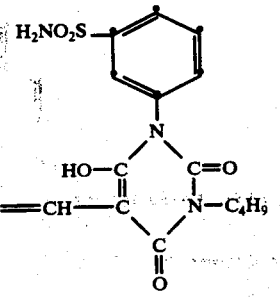
12.

-continued
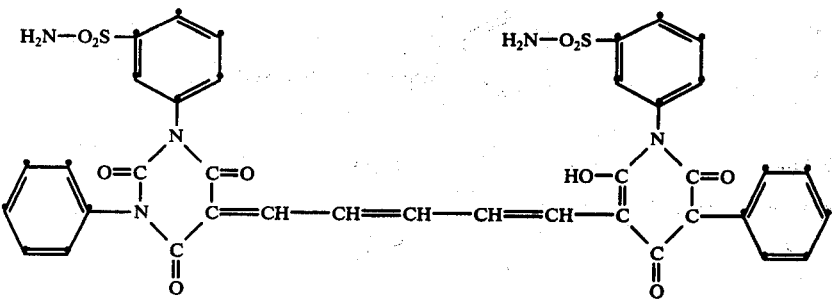
13.
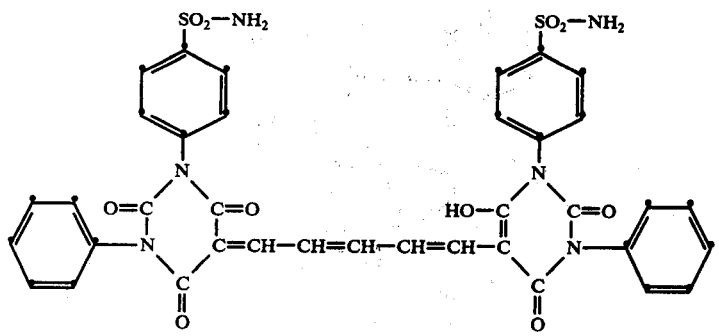
14.
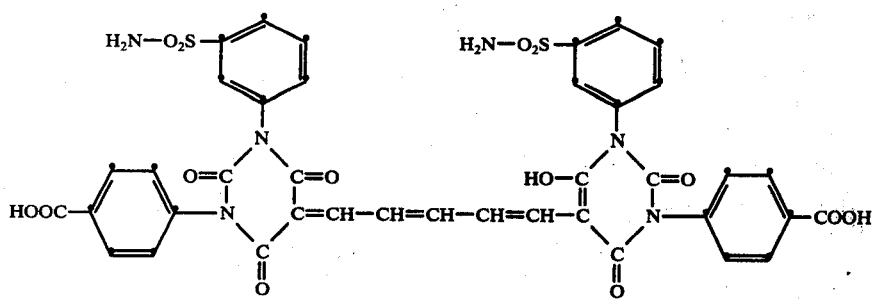
15.
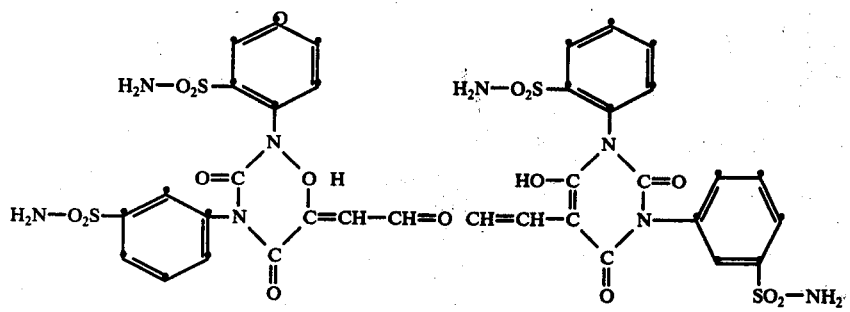
16.
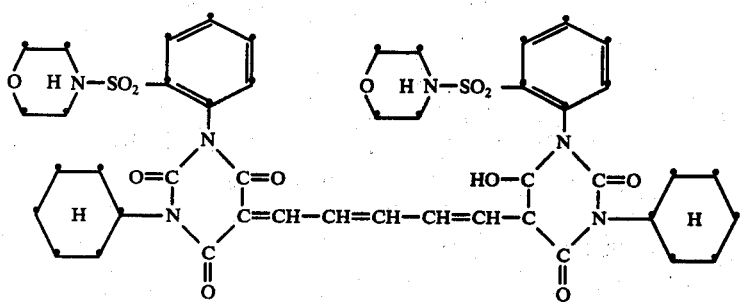
17.

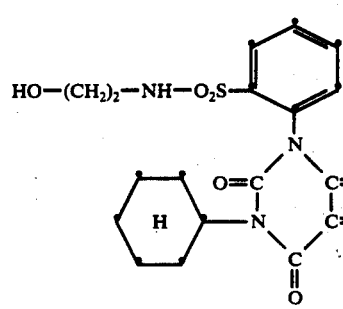
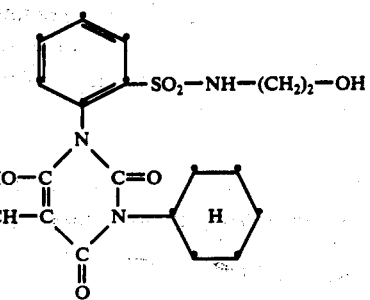
18.
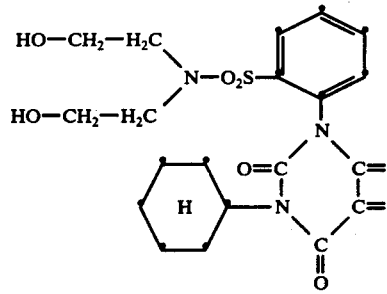
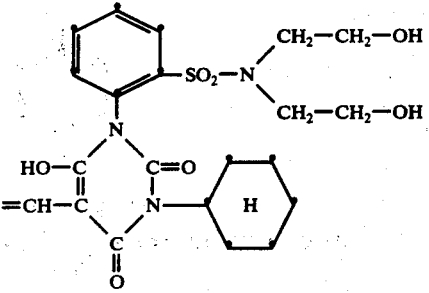
19.
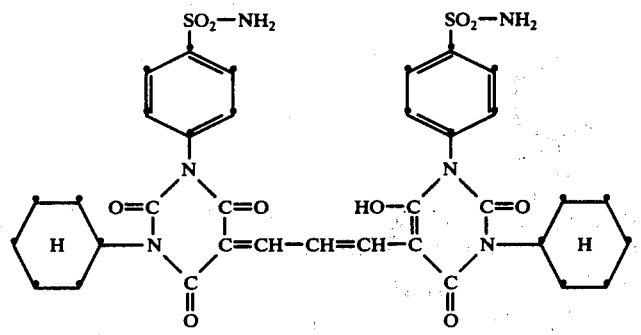
20.
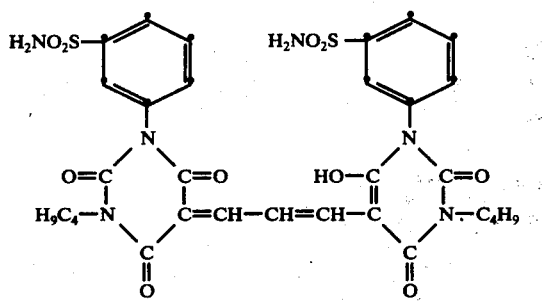
21.
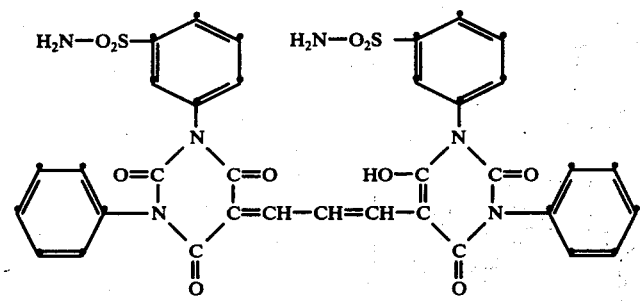
22.

-continued
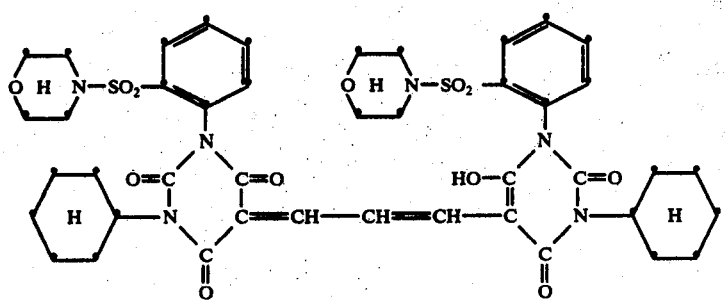
23.
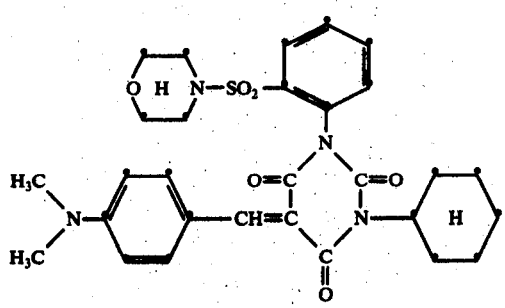
24.
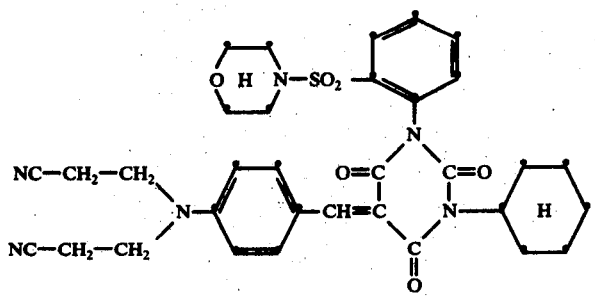
25.
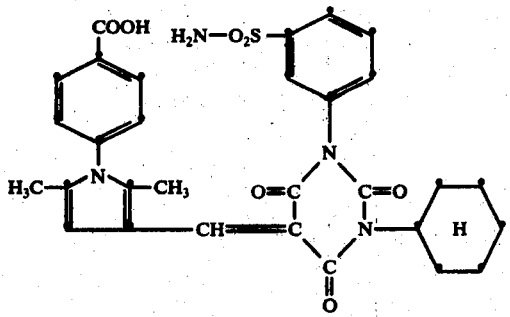
26.
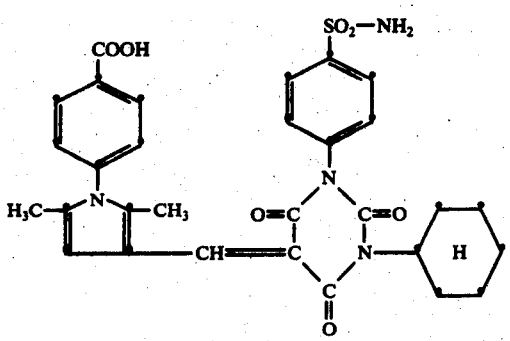
27.

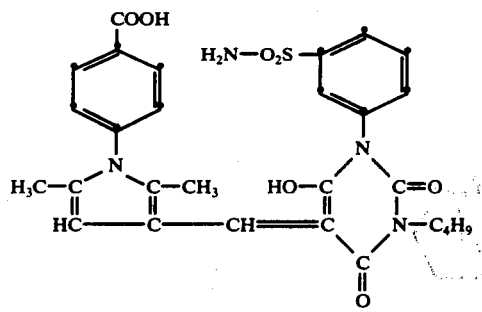
27.
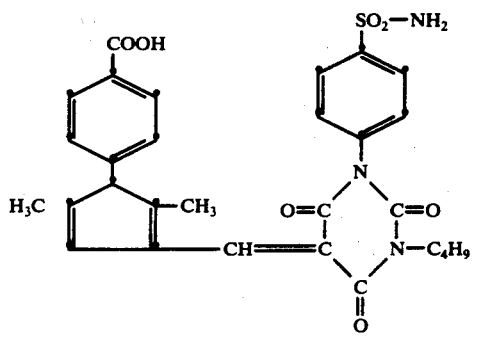
28.
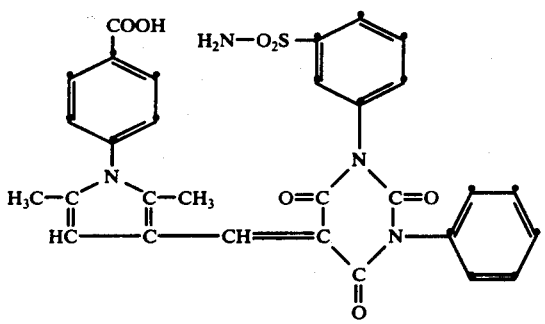
29.
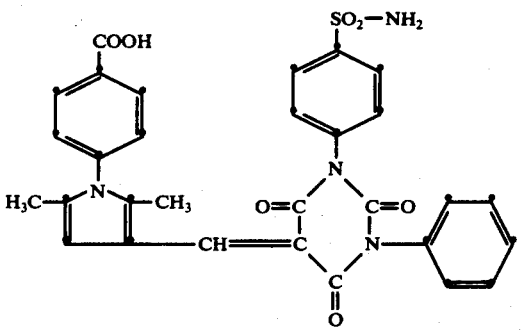
30.
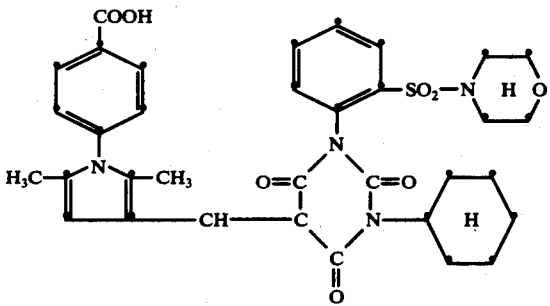
31.
The dyes of the present invention can be prepared from the appropriately substituted novel barbituric acids of the following formula V:

-continued

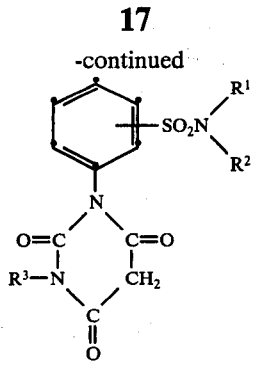

wherein R¹, R² and R³ are defined as hereinbefore, by the precedures set forth hereinafter.

As is illustrated by the following preparations, the barbituric acids can be prepared by reaction of the appropriate urea with malonylchloride or with malonic acid in the presence of acetic anhydride or acetylchloride. The urea can be obtained by reaction of an organic isocyanate with a primary amine in an inert solvent such as benzene or acetone.

PREPARATION 1 a. N-cyclohexyl-N'-(2-fluorosulphonylphenyl) urea

To a stirred solution of 2-fluorosulphonyl phenyl isocyanate (804 g, 4 moles) in benzene (4 l), cyclohexylamine (457 ml, 4 moles) was added dropwise, whilst the temperature was kept at 60°. The mixture was left standing overnight at room temperature, whereupon the product was collected, washed with benzene (4 l) and dried. Yield : 1070–1090 g (89–90 %), melting point : 177° C.

Analysis : Found : 51.8%, C; 5.67%, H; 0.25%, N. Calculated : 52.0%, C; 5.65% H; 9.35%, N.

b. 1-cyclohexyl-3-(2-sulphamoylphenyl)barbituric acid

A mixture of N-cyclohexyl-N'-(2-fluorosulphonylphenyl) urea (300 g, 1 mole), malonic acid (156 g, 1 mole) and acetylchloride (427 ml, 6 moles) was refluxed for 4 hours with stirring, cooled to room temperature, poured into water (4.25 l) and stirred for 1 hour to decompose the excess of acetylchloride. Then the 1-cyclohexyl-3-(2-fluorosulphonylphenyl)barbituric acid formed was added with portions and with stirring to 1N ammoniumhydroxide (5 l, 5 moles). After the last addition, stirring was continued for still an hour. Some insoluble material was filtered off and the filtrate was carefully acidified with 6N sulphuric acid (835 ml) whilst cooling by the addition of crushed ice. After 1 hour the precipitate was collected, digested with water (2.5 l), filtered off and dried, yielding 180–270 g of a product containing 69–81% of the desired barbituric acid (by titration of the CH₂), the remaining 19–31% consisting mainly of 1-cyclohexyl-2-acetyl-3-(2-sulphamoylphenyl)barbituric acid, as determined by TLC and NMR.

c. An alternative preparation of 1-cyclohexyl-3-(2-sulphamoylphenyl)barbituric acid is as follows Malonyldichloride (168 g, 1.2 mole) was added with stirring to N-cyclohexyl-N'-(2-fluorosulphonylphenyl-)urea (270 g, 0.9 mole) in dry chloroform (1500 ml). This mixture was heated for 6 hours at 40°–50° C and then cooled below 20° C, whereupon 300 ml of methanol were added cautiously. The reaction mixture was then evaporated under reduced pressure yielding 253 g of 1-cyclohexyl-3-(2-fluorosulphonylphenyl)barbituric acid. This sulphofluoride was converted into the sulphonamide as described under b) with a nearly quantitative yield.

PREPARATION 2 a. N-butyl-N'-(4-sulphamoylphenyl) urea

A mixture of 4-aminobenzenesulphonamide (172 g, 1 mole), butylisocyanate (99 g, 1 mole) and acetone (150 ml) was refluxed for 7 hours. The urea, crystallizing after cooling, was collected and washed with acetone. Yield : 188 g. Melting point : 193° C. A second crop (48 g) was obtained by concentrating the filtrate to 0.5 l. The NMR spectrum was wholly consistent with the formula of N-butyl-N'-(4-sulphamoylphenyl) urea.

b. 1-butyl-3-(4-sulphamoylphenyl) barbituric acid

To the urea of preparation 2(a) (13.5 g; 0.05 mole) and malonic acid (6.25 g; 0.06 mole) in acetic acid (30 ml) at 60°–70° C, acetic anhydride (20 ml) was added dropwise, whereupon the temperature was raised to 90°–95° C. After 6 hours the mixture was poured into 1N sulphuric acid (200 ml) and refluxed with stirring for 15 minutes. After cooling to room temperature, the precipitate was collected and recrystallized from isopropanol, yielding a product (8.5 g) containing 87% of the desired barbituric acid, the remaining 13% consisting mainly of isopropanol as determined by titration, TLC and NMR respectively.

The symmetrical oxonol dyes of the present invention can be prepared by allowing the appropriately substituted barbituric acids of formula V to react in the presence of a base such as triethylamine or pyridine and optionally in the presence of an inert solvent such as acetonitrile with compounds known to those skilled in the art for introducing a methine chain in methine dyes. For more details about such compounds reference may be made to UK Pat. No. 1,133,986.

More particularly, for the introduction of a trimethine chain an alkoxyacrolein acetal, anilinoacrolein anil or malondialdehyde diacetal can be used whereas for introducing a pentamethine chain glutacondialdehyde dianil can be used.

The other dyes of the present invention can be prepared by allowing the appropriately substituted barbituric acids of formula V to react with a benzaldehyde, cinnamaldehyde or 3-pyrrole carboxaldehyde. The reaction can be carried out by heating in the presence of a basic condensing agent such as sodium acetate or pyridine. The reaction can also occur in an inert diluent such as methanol, ethanol, ethylene glycol monomethyl ether, acetonitrile, acetic acid, dimethyl sulphoxide, tetrahydrothiophene-1,1-dioxide or dimethyl formamide optionally in the presence of a basic condensing agent.

The 3-pyrrole carboxaldehydes and the benzaldehydes are known in the art and can be prepared from the corresponding pyrroles or anilines, phenols, alkyl phenyl esters and alkyl phenyl thioethers according to the Vilsmeier and Haack reaction (Ber. 60, 119, 1972) using dimethyl formamide as formylating agent. The cinnamaldehydes are also known in the art and can be prepared analogously to the Vilsmeier reaction, as described by C.Jutz, Ber. 91, 850 (1957) with N-methyl anilinopropene (1)-al (3) and the appropriate anilines, phenols, alkyl phenyl ethers and alkyl phenyl thioethers. The latter compounds can be prepared by methods well known in organic chemistry.

The following preparations illustrate how the dyes are prepared.

PREPARATION 3 (Dye 1)

The product of preparation 1 (b) containing 71% of 1-cyclohexyl-3-(2-sulphamoyl phenyl) barbituric acid (5.14 g, 0.01 mole), 4-dimethylaminobenzaldehyde (1.49 g, 0.01 mole) and isopropanol were refluxed for 20 minutes. After cooling overnight the dye (5.3 g) was collected with suction, washed with isopropanol and dried at 70° C.

Dyes 2, 23 and 24 were prepared in a similar way.

PREPARATION 4 (Dye 3)

The product of preparation 1 (b) containing 71% of cyclohexyl-3-(2-sulphamoylphenyl) barbituric acid (5.14 g, 0.01 mole), 4(biscarboxy methylamino) benzaldehyde (2.37 g, 0.01 mole), acetic acid (25 ml) and triethylamine (2.8 ml, 0.02 mole) were refluxed for 30 minutes and the mixture was then poured into water.

The precipitated dye was filtered off, washed with water and dried.

Dyes 4, 25, 26, 27, 28, 29, 30 and 31 were prepared in a similar way.

PREPARATION 5 (Dye 5)

To a hot solution of the product of preparation 1 (b) containing 71% of 1-cyclohexyl-3-(2-sulphamoylphenyl) barbituric acid (10.3 g, 0.02 mole) and anilinoacroleine anil hydrochloride (2.6 g; 0.01 mole) in acetonitrile (50 ml), triethylamine (11.2 ml; 0.08 mole) was added. The mixture was heated for 15 minutes and then poured into ice-water (500 ml) containing sulphuric acid (20 ml 5N). The precipitated dye was sucked off, digested for 1 hour with water (1 l), filtered off and dried.

Dyes 10, 20, 21 and 22 were prepared in a similar way.

PREPARATION 6 (Dye 6)

To a mixture of the product of preparation 2 (b) (7.86 g; 0.02 mole) and glutacondialdehyde dianil hydrochloride (2.8 g; 0.01 mole) in acetonitrile (50 ml), triethylamine (11.2 ml; 0.08 mole) was added with stirring. After 5 minutes acetic anhydride (2 ml) was added and the mixture was stirred for another 30 minutes whereupon it was poured into water (250 ml), containing sulphuric acid (1.67 ml 6N). The precipitated dye was collected, washed with water and dried.

Dyes 10, 11, 12, 14 and 15 were prepared in a similar way.

PREPARATION 7 (Dye 7)

The dye was prepared in the same way as described for dye 5 in preparation 5, but the anilinoacroleine anil hydrochloride was replaced by an equivalent quantity of glutacondialdehyde dianil hydrochloride.

Dyes 8, 9, 13, 16, 17 and 18 were prepared in a similar way.

The absorption characteristics (measured in methanol) of the representative dyes according to the present invention are listed in the following table.

Table

| dye no. | abs.max. (nm) | $\epsilon.10^{-4}$ |
| --- | --- | --- |
| 1 | 470 | 6.25 |
| 2 | 448 | 5.45 |
| 3 | 448 | 2.92 |
| 4 | 409 | 3.29 |
| 5 | 487 | 13.2 |
| 6 | 594 | 13.6 |
| 7 | 596 | 13.3 |
| 8 | 596 | 11.8 |
| 9 | 596 | 11.9 |
| 10 | 594 | 15.0 |
| 11 | 593 | 14.1 |
| 12 | 595 | 9.7 |
| 13 | 595 | 10.9 |
| 14 | 595 | 13.9 |
| 15 | 594 | 12.6 |
| 16 | 595 | 12.4 |
| 17 | 595 | 13.2 |
| 18 | 595 | 8.0 |
| 19 | 496 | 5.6 |
| 20 | 495 | 6.9 |
| 21 | 495 | 11.0 |
| 22 | 496 | 8.7 |
| 23 | 473 | 5.6 |
| 24 | 448 | 4.0 |
| 25 | 415 | 2.2 |
| 26 | 410 | 2.6 |
| 27 | 408 | 3.1 |
| 28 | 408 | 2.9 |
| 29 | 410 | 3.0 |
| 30 | 412 | 4.0 |
| 31 | 408 | 3.5 |

The dyes according to the invention can be applied in any photographic material based on light-sensitive silver halide, when easily dischargeable dyestuffs are desired or necessary. The dyes are particularly suitable for use in an antihalation layer between the support and a light-sensitive silver halide emulsion, because they do not diffuse into the emulsion layer. They can also be used successfully as filter dye in a colloid filter layer of a light-sensitive photographic multilayer element e.g. colour element, shielding at least one optically sensitized silver halide emulsion layer from the light of the wavelength absorbed by the said dye, or as screening dye in a light-sensitive layer itself. Said dyestuffs when used as screening dye in a light-sensitive silver halide emulsion layer do not or practically do not decrease the inherent and/or spectral sensitivity of the silver halide. The hydrophilic colloid binder of these layers containing a dye according to the present invention is usually gelatin. Other hydrophilic colloids can also be used, however, e.g. casein, polyvinyl alcohol, poly-N-vinyl pyrrolidone, sodium alginate, sodium carboxymethylcellulose, etc.

The dyes according to the present invention can also be used in antihalation coating applied to the side of the support opposite to that carrying the emulsion layer e.g. antihalation coatings containing a water-insoluble, alkali-soluble polymeric binder applied to a hydrophilic film support e.g. polyethylene terephthalate support. More details about water-insoluble, alkali-soluble polymeric binders suitable for this purpose and other features of such antihalation coatings can be found in U.S. Pat. No. 3,853,563. Preferred binders are co(styrene/acrylic acid) and co(vinyl acetate/maleic acid) binders.

The following examples illustrate the present invention.

EXAMPLE 1

A silver bromoiodide emulsion (2 mole % of iodide) was prepared according to the double jet method. After washing the emulsion was gold and sulphur sensitized and divided into three aliquot portions.

One portion of the emulsion was coated on a conventional support without addition of dye.

To another portion of the emulsion 400 mg of the following dye I was added per mole of silver halide before coating on the support :

dye 1

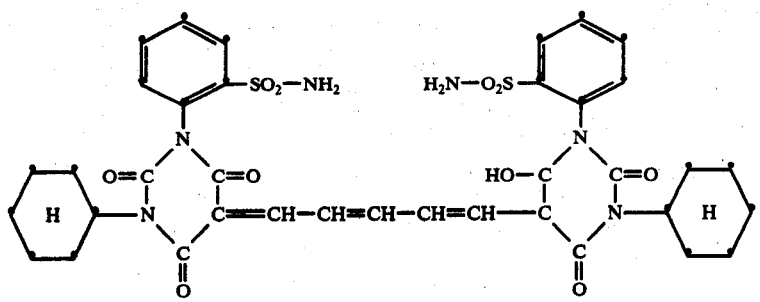

(absorption max. in coated layer : 600 nm)

To the third portion of the emulsion 280 mg of the following dye II (known from U.S. Pat. No. 3,653,905) was added per mole of silver halide, before coating on the support :

dye II

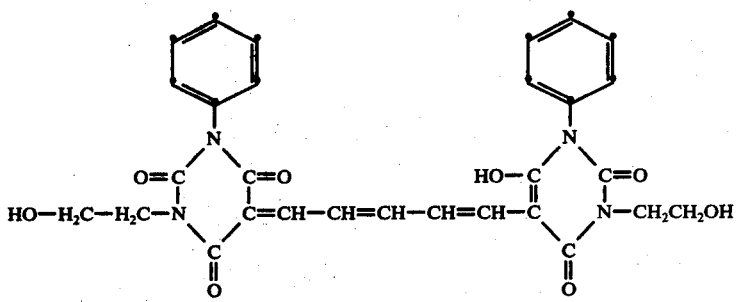

(absorption max. in coated layer : 600 nm)

After drying, the coated layers were exposed to monochromatic light (425 nm) using interference filters and developed in a conventional metol-hydroquinone developer.

The sensitometric results were as follows. The values given for the speed are relative values measured at density 1 above fog.

| dye added | relative speed | γ | $D_{max}$ |
|---|---|---|---|
| none | 100 | 3.00 | 3.35 |
| dye I | 102 | 3.06 | 3.40 |
| dye II | 72 | 3.04 | 3.30 |

From the above results it is apparent that the novel dye I causes no desensitization whereas the known dye II is responsible for a loss of speed.

EXAMPLE 2

Coating solutions of the following composition were prepared :

| Inert gelatin | 21.5 | g |
|---|---|---|
| Dyestuff as listed in the table below in an amount so as to obtain per sq.m after coating the amount of dyestuff given in said table | | |
| Saponine | 0.6 | g |
| 4% aqueous solution of formaldehyde | 15 | ml |
| water to make | 500 | ml |

The solutions were coated on subbed polyester supports pro rata of 47 g/sq.m so that 2 g of gelatin was present per sq.m.

Table

| dyestuff | mg/sq.m | abs.max. | density |
|---|---|---|---|
| 4 | 260 | 408 | 0.60 |
| 5 | 75 | 497 | 0.65 |
| 7 | 71 | 603 | 0.53 |
| 23 | 300 | 480 | 0.73 |
| 24 | 300 | 455 | 0.60 |

The density of the layers was not lowered markedly after rinsing with water for 3 minutes. This proves the excellent fastness of the dyes to diffusion. No desensitization is measured when optically sensitized emulsion layers are coated over the said dyestuff layers, which are completely discoloured during conventional black and white or colour processing.

We claim:

1. A light-sensitive photographic element comprising a support, at least one light-sensitive silver halide emulsion layer and a colloid layer containing a dye corresponding to the formula :

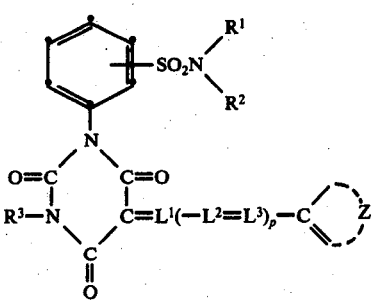

wherein :

Z represents the atoms necessary to form :
  1. a barbituric acid nucleus so that a symmetrical oxonol dye is obtained, 2. a phenyl group so that a benzylidine or cinnamylidene dye is obtained, or 3. a pyrrole ring, each of $L^1$, $L^2$ and $L^3$ represents a methine group, p represents 0 for Z having significance (3), 0 or 1 for Z having significance (2), or 1 or 2 for Z having significance (1), $R^3$ represents an aliphatic or aromatic hydrocarbon group, $R^1$ represents hydrogen, an alkyl group, an acyl group or an amino group, and $R^2$ represents hydrogen, an alkyl group or an aryl group, or $R^1$ together with $R^2$ represents the atoms necessary to complete a heterocycle.

2. An element according to claim 1, wherein in the formula of the dye $R^3$ represents an aliphatic hydrocarbon group of 4 to 10 carbon atoms.

3. An element according to claim 1, wherein in the formula of the dye $R^3$ is cyclohexyl.

4. An element according to claim 1, wherein in the formula of the dye $R^1$ and $R^2$ are hydrogen.

5. An element according to claim 1, wherein in the formula of the dye $R^1$ together with $R^2$ forms the atoms necessary to close a morpholine nucleus.

6. An element according to claim 1, wherein the dye corresponds to the formula :

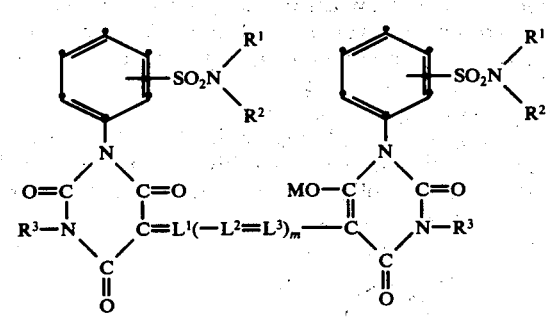

wherein :

m represents 1 or 2, $R^1$, $R^2$, $R^3$, $L^1$, $L^2$ and $L^3$ are defined as in claim 2, and M is a cation.

7. An element according to claim 1, wherein the dye corresponds to the formula :

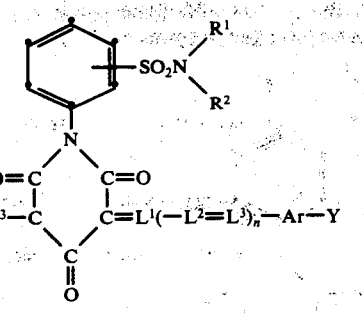

wherein :

n represents 0 or 1, $R^1$, $R^2$, $R^3$, $L^1$, $L^2$ and $L^3$ are defined as in claim 2, Y represents hydroxyl, alkoxy, alkylthio or an amino group, and Ar represents a phenylene group or naphthylene group.

8. An element according to claim 7, wherein in the formula of the dye Y represents a N,N-di(carboxyalkyl)amino group.

9. An element according to claim 1, wherein the dye corresponds to the formula :

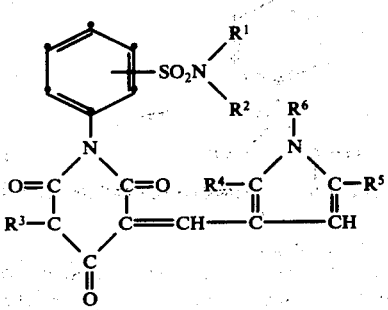

wherein :

$R^1$, $R^2$ and $R^3$ are defined as in claim 2, each of $R^4$ and $R^5$ are hydrogen or alkyl, and $R^6$ represents an alkyl or aryl group.

10. A light-sensitive photographic element according to claim 1, wherein the colloid layer containing the dye is a hydrophilic collid antihalation layer coated at the side of the support carrying the light-sensitive silver halide emulsion layer(s).

11. A light-sensitive photographic element according to claim 1, wherein the support is a film support and the colloid layer is an antihalation layer coated at the side opposite to that carrying the light-sensitive silver halide emulsion layer(s) and comprising a water-soluble, alkali-soluble binder.

12. A light-sensitive photogaphic element according to claim 1, wherein the colloid layer is a colloid layerof a light-sensitive photographic multilayer element shielding at least one optically sensitized silver halide emulsion layer from the light of the wavelength absorbed by the dye.

13. A light-sensitive photographic element according to claim 1, wherein the colloid layer is a light-sensitive silver halide emulsion layer.

* * * * *

UNITED STATES PATENT AND TRADEMARK OFFICE
CERTIFICATE OF CORRECTION

PATENT NO. : 4,042,397

DATED : August 16, 1977

INVENTOR(S) : Felix Jan MOELANTS ET AL

It is certified that error appears in the above—identified patent and that said Letters Patent is hereby corrected as shown below:

Column 18, line 61, "esters" should read --ethers--;

Column 18, line 62, "1972" should read --1927--;

Column 19, line 39, after "Dyes," "10" should be --19--;

Column 20, line 49, "coating" should read --coatings--;

Column 21, formula for "dye I" should appear as follows:

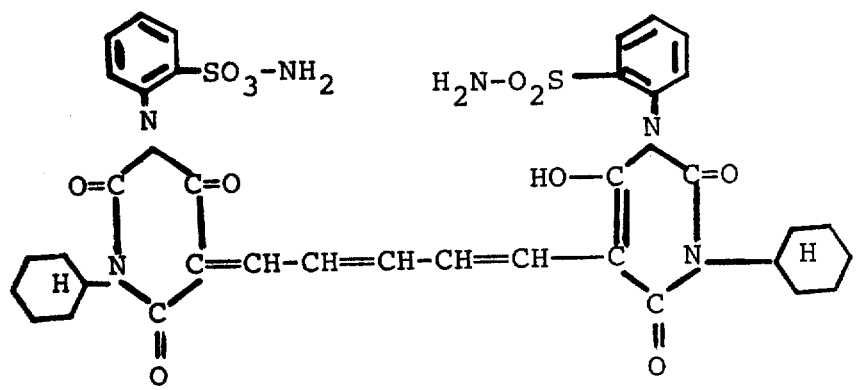

UNITED STATES PATENT AND TRADEMARK OFFICE
CERTIFICATE OF CORRECTION

PATENT NO. : 4,042,397

DATED : August 16, 1977

INVENTOR(S) : Felix Jan MOELANTS ET AL

It is certified that error appears in the above—identified patent and that said Letters Patent is hereby corrected as shown below:

Column 23, line 1, "benzylidine" should read

--benzylidene--;

Column 24, claim 11, line 53, "water-soluble" should read

--water insoluble--; and,

Column 24, claim 12, line 56, "layerof" should read --layer of--.

Signed and Sealed this

Twenty-seventh Day of December 1983

[SEAL]

Attest:

GERALD J. MOSSINGHOFF

Attesting Officer

Commissioner of Patents and Trademarks